United States Patent
Cadalen

(10) Patent No.: US 9,631,473 B2
(45) Date of Patent: Apr. 25, 2017

(54) INSTALLATION FOR DRILLING A WELL INTO A SOIL AND ASSOCIATED DRILLING METHOD

(71) Applicant: GEOSERVICES EQUIPEMENTS, Roissy en France (FR)

(72) Inventor: Sebastien Cadalen, Aubervilliers (FR)

(73) Assignee: GEOSERVICES EQUIPMENTS, Paris Nord II (FR)

( * ) Notice: Subject to any disclaimer, the term of this patent is extended or adjusted under 35 U.S.C. 154(b) by 209 days.

(21) Appl. No.: 14/371,720

(22) PCT Filed: Jan. 16, 2013

(86) PCT No.: PCT/IB2013/050387
§ 371 (c)(1),
(2) Date: Jul. 10, 2014

(87) PCT Pub. No.: WO2013/108184
PCT Pub. Date: Jul. 25, 2013

(65) Prior Publication Data
US 2014/0374160 A1    Dec. 25, 2014

(30) Foreign Application Priority Data
Jan. 17, 2012  (EP) ..................... 12305063

(51) Int. Cl.
*E21B 44/00* (2006.01)
*E21B 21/01* (2006.01)
(Continued)

(52) U.S. Cl.
CPC .............. *E21B 44/00* (2013.01); *E21B 21/01* (2013.01); *E21B 21/08* (2013.01); *G01F 1/002* (2013.01); *G01F 1/66* (2013.01)

(58) Field of Classification Search
USPC ............................................. 175/48
See application file for complete search history.

(56) References Cited

U.S. PATENT DOCUMENTS 3,342,069 A    9/1967  Brewer
4,145,914 A    3/1979  Newman
(Continued)

FOREIGN PATENT DOCUMENTS

EP    0437872 A2   7/1991
GB    2249392 A    5/1992

OTHER PUBLICATIONS

Office Action issued in related EP Application No. 12305063.5 on Feb. 1, 2016, 5 pages.

*Primary Examiner* — Taras P Bemko
(74) *Attorney, Agent, or Firm* — Cameron R. Sneddon

(57) ABSTRACT

An installation (11) for drilling a well (13) into a soil comprising: —a discharge pipe (25) connected to the well (13) for recovering a drilling mud created by the drilling fluid mixing with components from the soil; —a flow rate sensor (92) to measure at least one parameter of the recovered drilling mud and generate a parameter value; —a calculator (94) connected to the flow rate sensor (92) to receive the parameter value in order to calculate a flow rate of the recovered drilling mud using the parameter value; characterized in that it further comprises a flume (90) having a throat and an approach channel hydraulically connected to the discharge pipe (25) to receive the recovered drilling mud, the measured parameter of the recovered drilling mud being representative of a height of the recovered drilling mud in the approach channel.

10 Claims, 4 Drawing Sheets

(51) Int. Cl.
  *E21B 21/08*   (2006.01)
  *G01F 1/00*    (2006.01)
  *G01F 1/66*    (2006.01)

(56) References Cited

U.S. PATENT DOCUMENTS

| | | |
|---|---|---|
| 4,887,464 A | 12/1989 | Tannenbaum et al. |
| 6,257,354 B1 | 7/2001 | Schrader et al. |
| 2002/0129943 A1* | 9/2002 | Maus ................. E21B 21/08 |
| | | 166/358 |
| 2003/0113167 A1 | 6/2003 | Anderson et al. |

* cited by examiner

INSTALLATION FOR DRILLING A WELL INTO A SOIL AND ASSOCIATED DRILLING METHOD

The present invention relates to an installation for drilling a well into a soil according to the preamble of claim 1.

The present invention also relates to an associated drilling method.

When drilling an oil well or a well for another effluent (in particular gas, vapor, water), it is known to inject a drilling fluid into the well and to recover a drilling mud generated by the mixing of the drilling fluid with components from the soil.

It is also known to periodically recover samples contained in the drilling mud emerging from the well, in view of their analysis to determine geological information on the nature of the formations which are drilled. Additionally, some analysis are carried out to determine the chemical and physical properties of the cuttings, for example the compositional and dimensional properties of the cuttings.

The above-mentioned analyses are carried out either in the vicinity of the well being drilled, for example in a specifically equipped cabin, or in a laboratory dedicated to the study of the cuttings, away from the drilling site.

However, the flow rate of the drilling mud needs to be monitored in the discharge pipe, e.g. in order to feed a model in which the depth in the well at which the samples have been extracted is determined. Knowing the drilling mud flow rate and the well and discharge pipe geometry, a depth may be attributed to each sample as a function of the time at which the sample was taken.

The drilling mud flow rate is also a necessary parameter in assessing the safety of the drilling operation.

There are known techniques for assessing the drilling mud flow rate in the discharge pipe, such as diverting a fraction of the flow through a vibrant U shaped by-pass pipe and assessing the Coriolis force on the by-pass pipe, which leads the mass flow rate of the drilling mud. Unfortunately, the devices of this type are complex and expensive. Moreover, the by-pass causes a pressure loss in the discharge pipe and often triggers an accumulation of residues contained in the drilling mud and a clogging of the by-pass.

Ultrasonic flow meters may be used to overcome these drawbacks. However, they are sensitive to the drilling mud quality, as particles and bubbles have a strong impact on the ultrasounds propagation. They are also sensitive to the density of the drilling mud, which modifies the speed of ultrasounds.

One aim of the invention is therefore to provide an installation for drilling a well into a soil that provides an accurate value of the recovered drilling mud flow rate, in a simple and cheap manner.

One additional aim of the invention is to obtain a method of drilling a well into a soil that is less expensive and provides an accurate value of the flow rate of the recovered drilling mud.

To this aim, the invention proposes an installation of the above-mentioned type, further comprising a flume having a throat and an approach channel hydraulically connected to the discharge pipe to receive the recovered drilling mud, the measured parameter of the recovered drilling mud being representative of a height of the recovered drilling mud in the approach channel.

In other embodiments, the installation comprises one or several of the following features, taken in isolation or any technical feasible combination:

the bottom of the approach channel is approximately horizontal when the installation is in a nominal position;

the approach channel has a cross sectional area which is larger than a cross sectional area of the discharge pipe where the discharge pipe connects to the flume for slowing down the recovered drilling mud in the approach channel;

the installation further comprises a mud tank for receiving the recovered drilling mud and a connection pipe extending between an outlet of the flume and the mud tank, the discharge pipe extending over a discharge pipe length between the well and the approach channel and the connection pipe extending over a connection pipe length between the flume outlet and the mud tank, and in that the discharge pipe length is smaller than, or equal to, the connection pipe length, preferably less than, or equal to 20% of the connection pipe length;

the installation further comprises a rheological sensor for measuring a rheological parameter, preferably a viscosity, of the recovered drilling mud, preferably in the discharge pipe, and for generating a rheological parameter value, the calculator (94) being connected to the rheological sensor to receive the rheological parameter value.

The invention also relates to a method of drilling a well in a soil, comprising the steps of:

injecting a drilling fluid into the well;

recovering said drilling mud from the well, said drilling mud being created by the drilling fluid mixing with components from the soil;

measuring a parameter of the recovered drilling mud and generating a parameter value; and calculating a flow rate of the recovered drilling mud using the parameter value; characterized in that the step of measuring the parameter of the recovered drilling mud comprises the substeps of:

flowing the recovered drilling mud through a flume having a throat and an approach channel; and measuring a parameter representative of a height of the recovered drilling mud in the approach channel, and generating said parameter value.

In other embodiments, the method comprises one or several of the following features, taken in isolation or any technical feasible combination:

the approach channel has a cross sectional area which is larger than a cross sectional area of the discharge pipe where the discharge pipe connects to the flume for slowing down the recovered drilling mud in the approach channel;

the bottom of the approach channel is approximately horizontal;

during the substep of measuring the parameter representative of the height of the recovered drilling mud in the approach channel, the recovered drilling mud having a free surface in the approach channel, a position of the free surface along said vertical direction is measured;

the method further comprises the step of measuring a rheological parameter, preferably a viscosity, of the recovered drilling mud, and generating a rheological parameter value, the rheological parameter value being used during the step of calculating the flow of the recovered drilling mud.

The invention will be better understood upon reading the following description given solely by way of example and with reference to the appended drawings, in which.

In everything that follows, the terms "upstream" and "downstream" are understood with respect to the normal direction of circulation of a fluid in a pipe.

Figure 1:
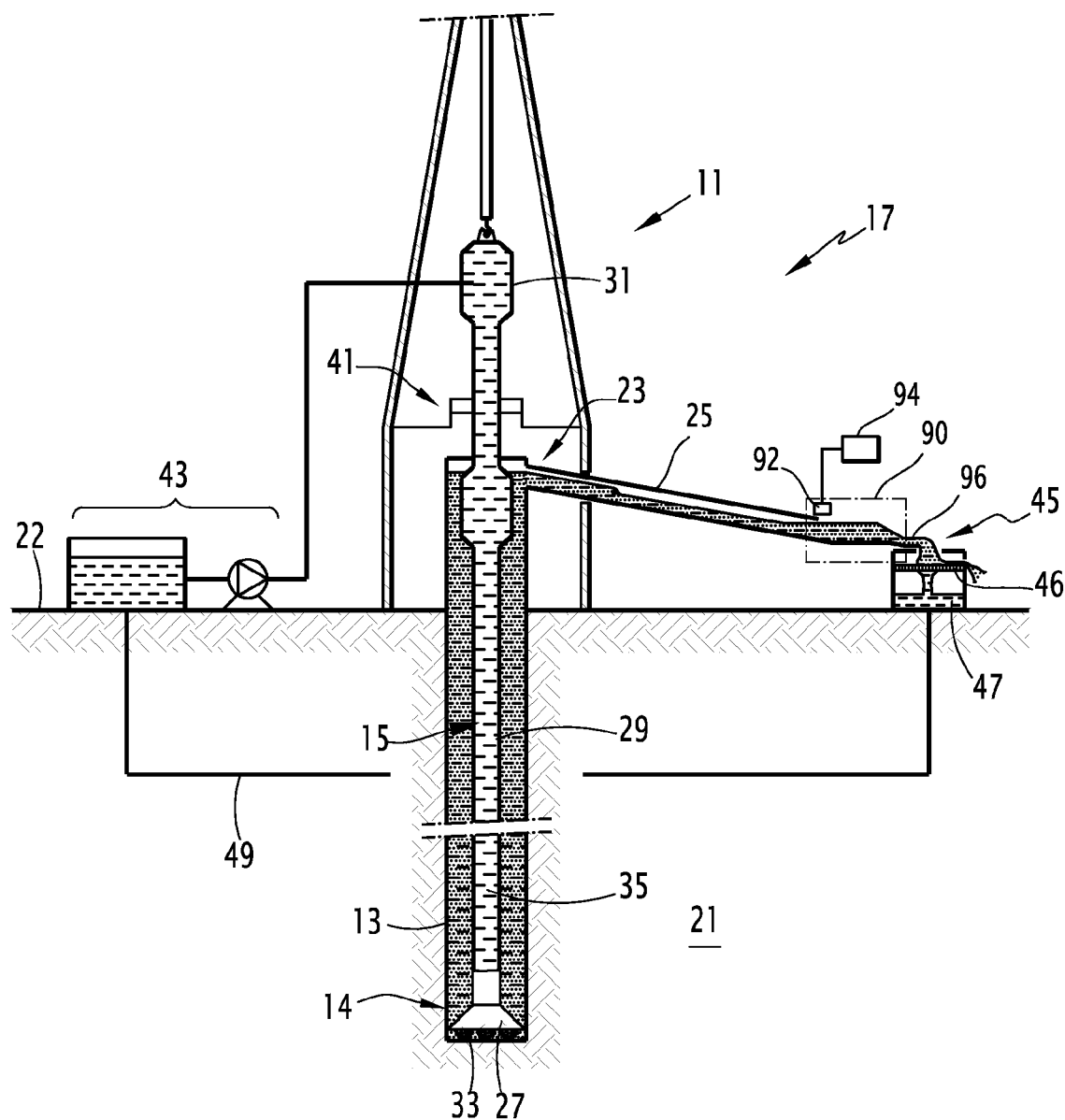
FIG. 1 is a schematic view, taken in a vertical section, of a drilling installation according to an embodiment of the invention.

As illustrated in FIG. 1, a drilling installation 11 according to the invention comprises a rotary drilling tool 15 drilling a cavity 14 in the ground, a surface installation 17, where drilling pipes are placed in the cavity 14.

A well 13 delimiting the cavity 14 is formed in the substratum 21 by the rotary drilling tool 15. At the surface 22, a well head 23 having a discharge pipe 25 closes the well 13.

The drilling tool 15 comprises a drilling head 27, a drill string 29 and a liquid injection head 31.

The drilling head 27 comprises means 33 for drilling through the rocks and/or sediments of the substratum 21, the drilling operation producing solid drilling residues or "cuttings". The drilling head 27 is mounted on the lower portion of the drill string 29 and is positioned at the bottom of the drilling pipe 13.

The drill string 29 comprises a set of hollow drilling pipes. These pipes delimit an internal space 35 which makes it possible to bring a drilling fluid from the surface 22 to the drilling head 27. To this end, the liquid injection head 31 is screwed onto the upper portion of the drill string 29.

The drilling fluid is in particular a drilling mud, in particular a water-based or oil-based drilling mud.

The surface installation 17 comprises means 41 for supporting the drilling tool 15 and driving it in rotation, means 43 for injecting the drilling liquid, and a shale shaker 45, for receiving and treating the effluent emerging from the well.

The injection means 43 are hydraulically connected to the injection head 31 in order to introduce and circulate the drilling fluid in the inner space 35 of the drill string 29.

The injections means 43 and the liquid injection head 31 form an assembly for injecting the drilling fluid into the well.

The shale shaker 45 collects the recovered drilling mud charged with cuttings coming from the discharge pipe 25. The shale shaker 45 is equipped with sieves 46 to allow the separation of the solid drilling residues or cuttings, from the recovered drilling mud.

The shale shaker 45 also comprises a mud tank 47 located under the sieves 46 to store the recovered drilling mud deprived of cuttings.

The surface installation 17 further comprises a recirculation duct 49 connecting the mud tank 47 to the injection means 43 to re-circulate the mud collected in the mud tank 47 to the injection means 43.

Figure 3:
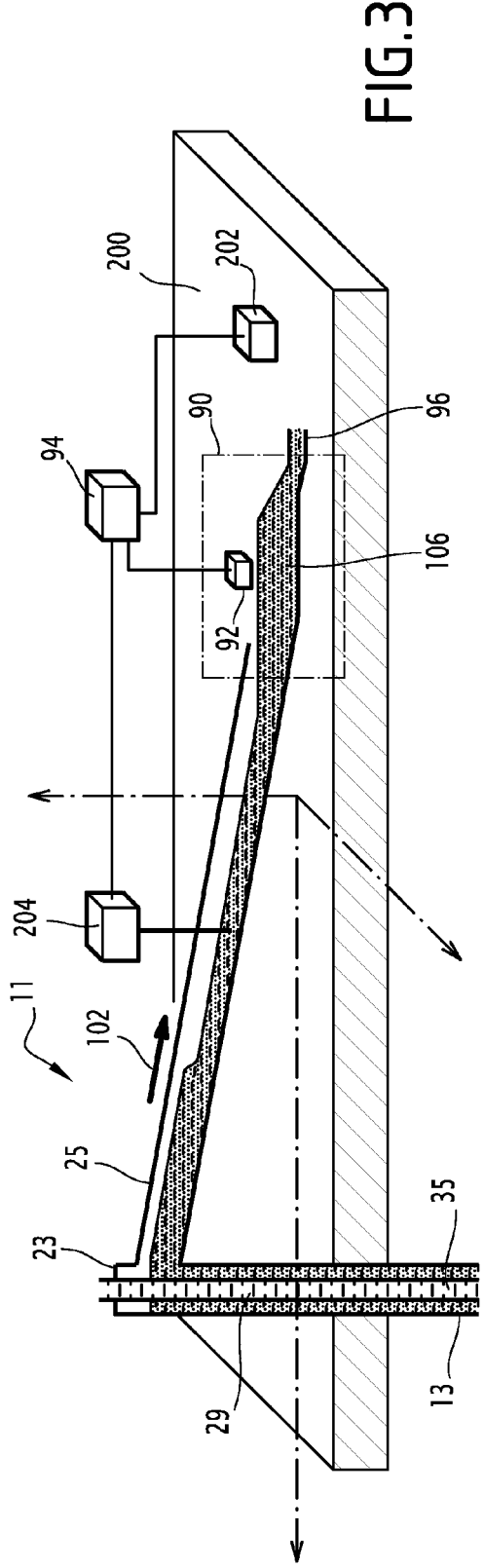
FIG. 3 is a schematic view, taken in a vertical section, of a drilling installation according to another embodiment of the invention.
Figure 5:
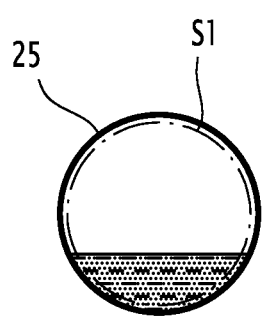
FIG. 5 is a schematic section view of the discharge pipe in the drilling installation shown in FIG. 1 according to a vertical plan.

In the example shown in FIGS. 1, 3 and 5, the discharge pipe 25 has a circular section.

The installation 11 further comprises a mud flow rate measuring device having a flume 90 hydraulically connected upstream to the discharge pipe 25, a flow rate sensor 92, a calculator 94 connected to the flow rate sensor 92.

The installation further comprises a connection pipe 96 extending between the flume 90 and the shale shaker 45.

Figure 2:
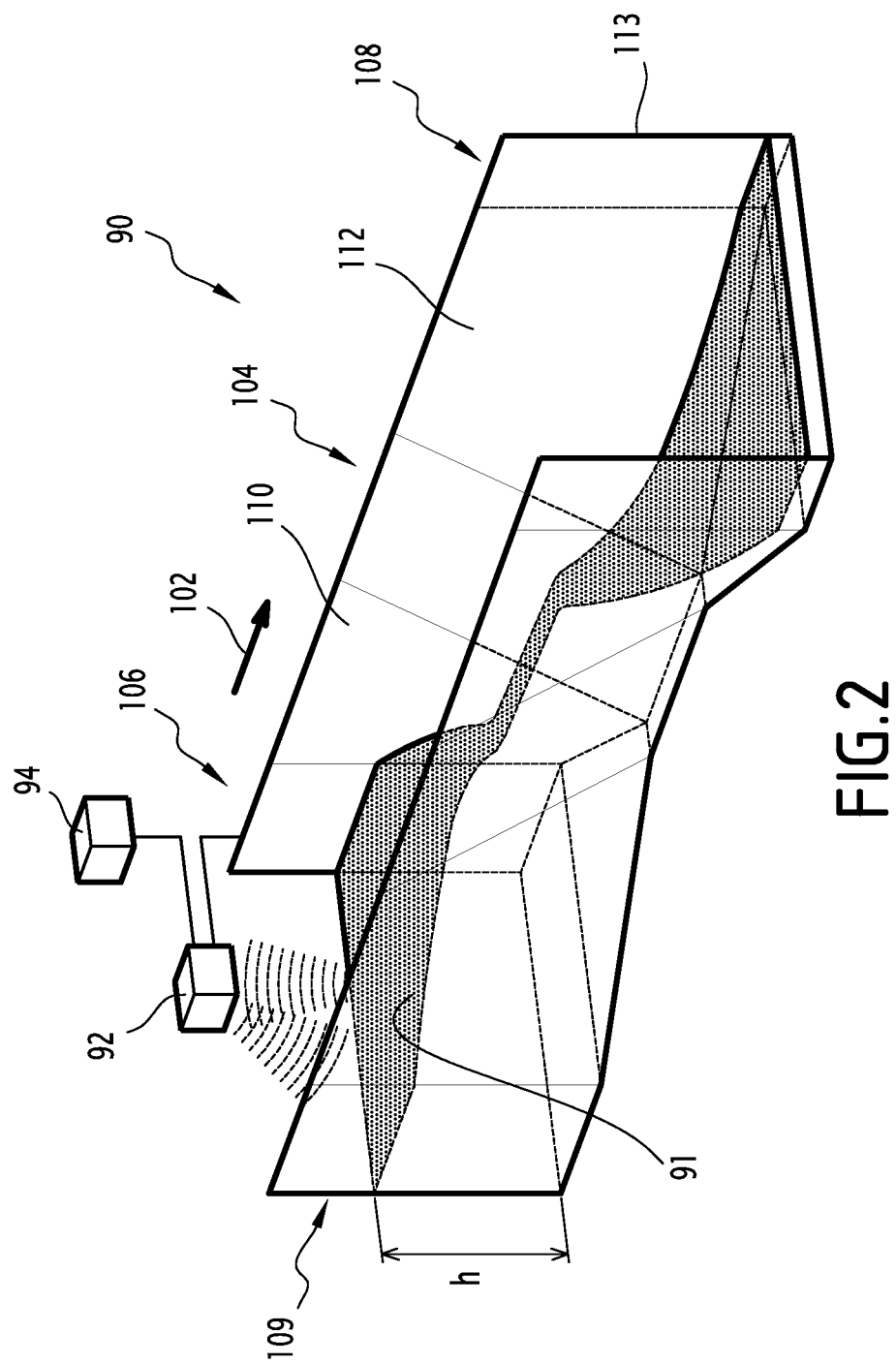
FIG. 2 is a schematic perspective view of a flume in the drilling installation shown in FIG. 1.

As illustrated in FIG. 2, the flume 90 is an open channel. Optionally the flume 90 can be covered. However, the flume 90 is sized so that the drilling mud flowing through it has a free upper surface 91 delimiting a gaseous upper volume, as the drilling mud would have in an open channel.

In terms of shape, the flume 90 is advantageously analogous to any of the flumes described in the international standard ISO 4359, first edition, dated 1983, which are intended to be used to measure a water flow.

The drilling mud flow direction in the flume 90 is shown by an arrow 102.

The flume 90 comprises a throat 104, an approach channel 106 located upstream the throat 104 and an exit channel 108 located downstream the throat 104.

Due to the presence of a throat, flumes such as the flume 90 are often referred to as "Venturi flumes".

The approach channel 106 comprises an inlet 109 hydraulically connected to the discharge pipe 25 and an entrance transition 110 opening into the throat 104.

Advantageously the length of the approach channel 106 along the flow direction is at least five times the width of the drilling mud flow free surface 91 at maximum flow rate.

Figure 6:
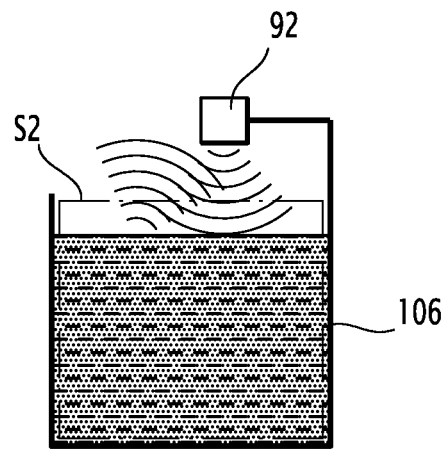
FIG. 6 is a schematic section view of an approach channel of the flume in the drilling installation shown in FIG. 1 according to a vertical plan.

In the example, the approach channel 106 section is rectangular (FIG. 6).

Advantageously the approach channel 106 has a cross sectional area S2 (FIG. 6) taken perpendicularly to the flow direction 102 which is larger than a cross sectional area S1 of the discharge pipe 25 (FIG. 5).

Advantageously, the bottom of the approach channel 106 is horizontal.

The objective of this particular configuration of the approach channel 106 is to slow down the drilling mud flow in the approach channel 106. S2 is large enough to ensure that the recovered drilling mud flow is subcritical in the approach channel 106.

The entrance transition 110 has a convergent section along the flow direction 102. The entrance transition 110 extends along a downstream part of the approach channel 106.

Figure 7:
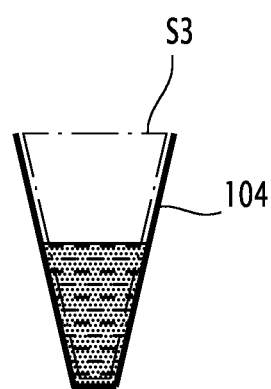
FIG. 7 is a schematic section view of a throat of the flume in the drilling installation shown in FIG. 1 according to a vertical plan.

The throat 104 has a trapezoidal section (FIG. 7) with a cross sectional area S3. In other specific embodiments the throat section can be rectangular, U shaped or of a more complex shape.

The throat 104 height and width are designed to ensure that S3 is large enough to admit the recovered drilling mud flow at a maximum flow rate with critical flow conditions.

The cross sectional area S3 at the throat 104 is smaller than the cross sectional area S2 at the approach channel 106. Advantageously, in the embodiment of FIG. 2, S3 is also smaller the cross sectional area S1 of the discharge pipe 25 at its connection with the approach channel 106.

The maximum flow rate and subcritical speed define a maximum hydraulic diameter of the throat. The throat 104 generally has a length along the flow direction 102 ranging between 0 and 10 times the maximum hydraulic diameter.

Figure 8:
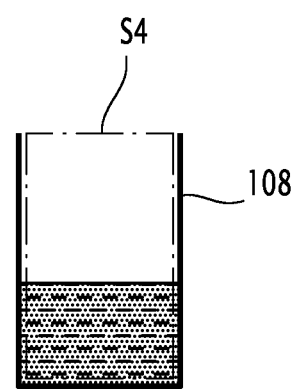
FIG. 8 is a schematic section view of an exit channel of the flume in the drilling installation shown in FIG. 1 according to a vertical plan.

The exit channel 108 comprises an exit transition 112 in which the throat 104 opens and an outlet 113 opening into the connection pipe 96. Downstream of the exit transition 112, the exit channel advantageously has a rectangular section (FIG. 8) with a cross sectional area S4.

S4 is larger than S3. In the embodiment of FIG. 2, S4 is also advantageously smaller than S2.

The exit transition 112 has a divergent section along the flow direction 102. The exit transition 112 occupies an upstream part of the exit channel 108.

The flow rate sensor 92 measures a parameter and generates a parameter value, the parameter being representative of a height h of the free surface 91 of the recovered drilling mud in the approach channel 106.

The flow rate sensor 92 for example comprises a radar system able to detect the position of the free surface 91 of the recovered drilling mud in the approach channel 106 and to provide a position value that the calculator 94 transforms into a height value.

The height h is referred to as "gauged head" in the above mentioned ISO 4359.

Advantageously the height h is measured in a section of the approach channel 106 that is located at a distance from the entrance transition 110 that is equivalent to at least three to four times the maximum height of the recovered drilling mud in the approach channel 106.

The calculator 94 is adapted to receive the parameter value generated by the flow rate sensor 92 and to calculate a flow rate of the recovered drilling mud in the flume 90 using the parameter value, in our example the height h of the recovered drilling mud.

For example, the equations given in the above mentioned ISO 4359, in particular in paragraph 11.4, may be programmed in the calculator 94 to calculate the flow rate from the height h. The main equation is then:

$$Q=(2/3)^{3/2}\sqrt{g}C_V C_S C_D b h^{3/2}$$

where:
Q is the recovered drilling mud flow rate in the flume 90,
g is the gravitational acceleration,
$C_V$ is a dimensionless coefficient allowing for an effect of the speed of the recovered drilling mud in the approach channel 106,
$C_S$ is a dimensionless shape coefficient to take into account the non rectangular geometry of the throat 104,
$C_D$ is a dimensionless coefficient of discharge,
b is the width at bed of the throat 104.

A method to calculate $C_V$, $C_S$ and $C_D$ is described in paragraph 11.4 of the above mentioned ISO 4359 and examples of calculation are given in appendix E.

Operation of the installation 11 during a drilling of a soil will now be described.

In reference to FIG. 1, during the drilling operations, the drilling tool 15 is driven in rotation by the surface installation 41. The drilling head 27 drills the rocks and sediments at the bottom of cavity 14 to produce cuttings.

During this operation, the drilling fluid, advantageously a liquid, is continuously introduced into the inner space 35 of the drill string 29 by the injection means 43.

The fluid moves downwards as far as the drilling head 27, and passes into the borehole through the drilling head 27.

The liquid cools and lubricates the drill string 29. The liquid is especially used to evacuate from bottom to surface the cuttings generated during the drilling process. Indeed, the liquid collects the solid cuttings resulting from the drilling operation and moves back upwards through the annular space defined between the drill string 29 and the borehole 13. The liquid charged with solids, in particular cuttings, forms the recovered drilling mud and is subsequently evacuated through the discharge pipe 25.

Figure 4:
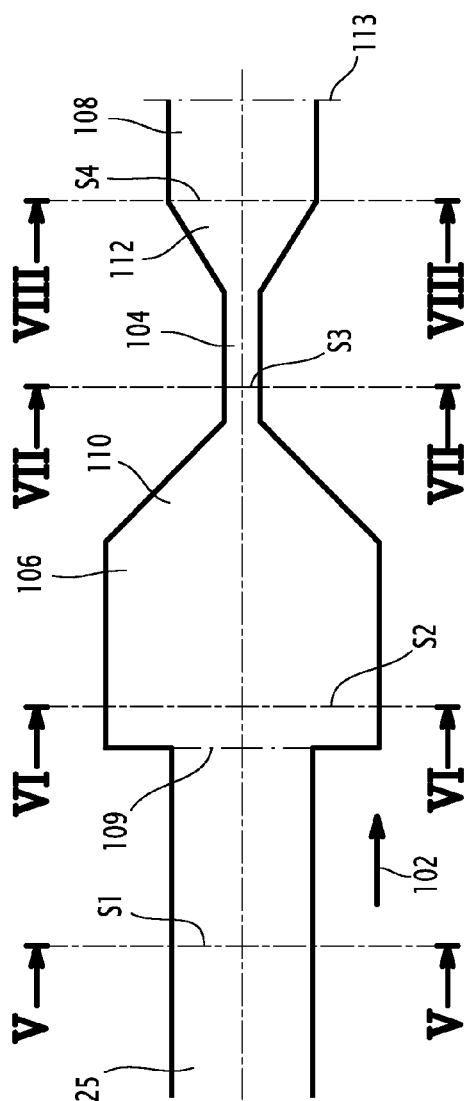
FIG. 4 is a schematic upside view of a discharge pipe and the flume in the drilling installations shown in FIG. 1 or FIG. 3.

The recovered drilling mud then flows through the flume 90 (FIGS. 2 and 4). The recovered drilling mud enters the approach channel 106. The approach channel 106 section is sized so that the speed of the recovered drilling mud is subcritical.

The critical speed in a rectangular channel is defined as c= $\sqrt{g \cdot h}$, where h is the height of fluid in the channel. Thus, with a height h in the range of 0.05 to 0.5 m, the critical speed is approximately in the range of 0.5 to 2.5 m/s. The speed is referred to as subcritical when it is below the critical speed.

The height h of the free surface 91 of the recovered drilling mud in the approach channel 106 is measured by the flow rate sensor 92. The sensor 92 generates a value of the height h which is sent to the calculator 94.

The flow rate of the recovered drilling mud is then calculated using the parameter value. The calculator 94 is for example programmed to compute the equations provided by the above mentioned ISO 4359, in particular in paragraph 11.4.

The recovered drilling mud accelerates in the entrance transition 110 and reaches its critical speed in the throat 104.

The recovered drilling mud further accelerates in the exit transition 112 and has a supercritical speed in the exit channel 108.

The recovered drilling mud is then evacuated via the connection pipe 96 towards the shale shaker 45 to separate the solids from the liquid which carries the solids. The cuttings above a certain side, i.e. higher than 1 mm, are retained on the sieves 46 of the shale shaker 45 and the liquid flows down through the sieves 46 to the mud tank 47.

The bottom of the flume 90 is advantageously approximately horizontal. If the bottom of the approach channel 106 and the throat 104 is horizontal, the flow is such that the speed of the recovered drilling mug is subcritical in the approach channel 106.

Owing to the fact the installation 11 comprises the flume 90 having a throat 104 and an approach channel 106 hydraulically connected to the discharge pipe 25 to receive the recovered drilling mud, the installation 11 is simplified compared with an installation having, for example, a Coriolis flow rate meter. As a consequence, the installation 11 is simpler and less expensive, while providing an accurate measurement of the recovered drilling mud flow rate.

The use of the flume 90 also reduces the risk of an accumulation of material from the recovered drilling mud.

Thanks to the fact the flume 90 is approximately horizontal, the calculation of the flow rate is simplified.

Since the approach channel 106 has a larger cross sectional area than the discharge pipe 25, the recovered drilling mud flow is subcritical in the approach channel 106, even if the flow is critical or supercritical at the downstream end of the discharge pipe 25.

A radar flow rate sensor 92 provides a convenient way to measure the position along a vertical direction of the upper free surface 91 of the recovered drilling mud in the approach channel 106.

As a variant, another parameter representative of the height h of the drilling mud in the approach channel 106, instead of the height h itself, can be measured by the flow rate sensor 92, for example a total head. This can be done using a stilling well connected to the approach channel 106. In that case the equations used to calculate the flow rate are adapted according to the above mentioned ISO 4359.

In another variant (not represented), the discharge pipe 25 extends over a discharge pipe length L1 between the well 13 and the flume inlet 109. The connection pipe 96 extends over a connection pipe length L2 between the flume outlet 113 and the mud tank 47. The discharge pipe length L1 is smaller than, or equal to, the connection pipe length L2, preferably less than, or equal to 20% of the connection pipe length L2. In that variant, the approach channel 106 may be less large and have approximately the same width as the discharge pipe 25.

Advantageously, the flume 90 is located at the outlet of the well head 23. In that case, the discharge pipe 25 is very short or does not exist (the approach channel 106 then acts as a discharge pipe).

As the discharge pipe length L1 is smaller than, or equal to, the connection pipe length L2, preferably less than, or equal to 20% the connection pipe length L2, the recovered drilling mud does not have enough time to accelerate in the discharge pipe 25, which makes it easier for the recovered drilling mud flow to remain subcritical in the approach channel 106.

In another variant, represented in FIG. 3, the installation 11 further comprises a rheological sensor 204 for measuring a rheological parameter, preferably a viscosity, of the recovered drilling mud, preferably in the discharge pipe 25, and for generating a rheological parameter value. The calculator 94 is connected to the rheological sensor 204 to receive the rheological parameter value.

The rheological parameter enables to calculate a Reynolds number and the discharge coefficient $C_D$ which appears in the above mentioned flow rate equation.

This allows taking into account potential changes in the rheological parameter value when calculating the recovered drilling mud flow rate.

The invention claimed is:

1. An installation for drilling a well into a soil comprising:
   a discharge pipe connected to the well for recovering a drilling mud created by the drilling fluid mixing with components from the soil;
   a flow rate sensor to measure at least one parameter of the recovered drilling mud and generate a parameter value;
   a calculator connected to the flow rate sensor to receive the parameter value in order to calculate a flow rate of the recovered drilling mud using the parameter value;
wherein the installation further comprises:
   a flume having a throat and an approach channel hydraulically connected to the discharge pipe to receive the recovered drilling mud, the measured parameter of the recovered drilling mud being representative of a height (h) of the recovered drilling mud in the approach channel, and
   a mud tank for receiving the recovered drilling mud and a connection pipe extending between an outlet of the flume and the mud tank, the discharge pipe extending over a discharge pipe length (L1) between the well and the approach channel and the connection pipe extending over a connection pipe length (L2) between the flume outlet and the mud tank, wherein the discharge pipe length (L1) is smaller than, or equal to, the connection pipe length (L2).

2. The installation according to claim 1, wherein the bottom of the approach channel is approximately horizontal when the installation is in a nominal position.

3. The installation according to claim 1, wherein the approach channel has a cross sectional area (S2) which is larger than a cross sectional area (S1) of the discharge pipe where the discharge pipe connects to the flume for slowing down the recovered drilling mud in the approach channel.

4. The installation according to claim 1, comprising a rheological sensor for measuring a rheological parameter, preferably a viscosity, of the recovered drilling mud, preferably in the discharge pipe, and for generating a rheological parameter value, the calculator being connected to the rheological sensor to receive the rheological parameter value.

5. The installation according to claim 1, wherein the discharge pipe length (L1) is less than, or equal to 20% of the connection pipe length (L2).

6. A method of drilling a well in a soil, comprising the steps of:
   injecting a drilling fluid into the well;
   recovering said drilling mud from the well in a discharge pipe connected to the well, said drilling mud being created by the drilling fluid mixing with components from the soil;
   measuring a parameter of the recovered drilling mud and generating a parameter value; and
   calculating a flow rate of the recovered drilling mud using the parameter value;
wherein the step of measuring the parameter of the recovered drilling mud comprises the substeps of:
   flowing the recovered drilling mud through a flume having a throat, an approach channel and a connection pipe extending between an outlet of the flume and a mud tank, wherein the discharge pipe extends over a discharge pipe length (L1) between the well and the approach channel and the connection pipe extends over a connection pipe length (L2) between the flume outlet and the mud tank; the discharge pipe length (L1) being smaller than, or equal to, the connection pipe length (L2); and
   measuring a parameter representative of a height (h) of the recovered drilling mud in the approach channel, and generating said parameter value.

7. The method according to claim 6, wherein the approach channel has a cross sectional area (S2) which is larger than a cross sectional area (S1) of the discharge pipe where the discharge pipe connects to the flume for slowing down the recovered drilling mud in the approach channel.

8. The method according to claim 6, wherein the bottom of the approach channel is approximately horizontal.

9. The method according to claim 6, wherein, during the substep of measuring the parameter representative of the height (h) of the recovered drilling mud in the approach channel, the recovered drilling mud having a free surface in the approach channel, a position of the free surface along a vertical direction is measured.

10. The method according to claim 6, wherein it further comprises the step of measuring a rheological parameter, preferably a viscosity, of the recovered drilling mud, and generating a rheological parameter value, the rheological parameter value being used during the step of calculating the flow of the recovered drilling mud.

* * * * *

UNITED STATES PATENT AND TRADEMARK OFFICE
CERTIFICATE OF CORRECTION

PATENT NO. : 9,631,473 B2  
APPLICATION NO. : 14/371720  
DATED : April 25, 2017  
INVENTOR(S) : Sebastien Cadalen Page 1 of 1

It is certified that error appears in the above-identified patent and that said Letters Patent is hereby corrected as shown below:

On the Title Page

Item [73], delete "GEOSERVICES EQUIPMENTS" and insert --GEOSERVICES EQUIPEMENTS--.

Signed and Sealed this  
Tenth Day of December, 2019

Andrei Iancu  
*Director of the United States Patent and Trademark Office*